(12) United States Patent
Lewis

(10) Patent No.: US 6,220,833 B1
(45) Date of Patent: Apr. 24, 2001

(54) ELIMINATION OF INLET VALVE FOR ABS PUMP

(75) Inventor: Dean A. Lewis, Goodrich, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/226,388

(22) Filed: Jan. 6, 1999

(51) Int. Cl.[7] .................................................... F04B 19/00
(52) U.S. Cl. ........................ 417/470; 417/555.1; 417/536
(58) Field of Search ...................... 92/240, 247; 137/854; 417/470, 550, 551, 555.1, 534, 535, 536

(56) References Cited

U.S. PATENT DOCUMENTS

| | | | |
|---|---|---|---|
| 1,820,883 | * | 8/1931 | Hueber ................................. 417/273 |
| 2,368,187 | * | 1/1945 | Williams ............................... 417/521 |
| 3,092,427 | * | 6/1963 | Sadler et al. ............................ 92/194 |

* cited by examiner

Primary Examiner—F. Daniel Lopez
Assistant Examiner—Thomas E. Lazo
(74) Attorney, Agent, or Firm—Rader, Fishman & Grauer PLLC

(57) ABSTRACT

A reciprocating piston-type pump for a brake system, such as an antilock brake system, includes a housing having an inlet and an outlet connected by a bore containing one or more pistons driven by an eccentric shaft for pumping high pressure brake fluid to one or more vehicle brakes. Each pump piston includes a directional seal for selectively sealing the gap between the piston and the bore permitting high pressure to be developed on a pressure stroke of the piston but permit fluid to pass by the seal during an intake or return stroke. The directional seal can have a cup shape to achieve these functions. Accordingly, the need for a one-way inlet check valve inside the piston is eliminated. The overall pump design can therefore be reduced in size and associated manufacturing costs are reduced.

4 Claims, 1 Drawing Sheet

ELIMINATION OF INLET VALVE FOR ABS PUMP

FIELD OF THE INVENTION

The present invention relates to a high pressure hydraulic pump, and more particularly to an opposed piston-type pump for use in antilock brake systems ("ABS") and other brake control systems for vehicles.

BACKGROUND OF THE INVENTION

Typical ABS systems for vehicles include an electric motor driven opposed piston-type pump for supplying pressurized brake fluid to any one of the vehicle brakes on instant, automatically controlled, demand. The electric motor is a part of the ABS unit and includes a drive shaft having an eccentric or cam portion. A pair of pumping pistons are located on opposite sides of the drive shaft within a body of the pump. Respective input and output passageways allow for proper circulation of fluid through the pump. The output associated with each pumping piston provides high pressure brake fluid, approximately 2500 psi, to an associated brake or group of brakes on the vehicle. The ABS system is typically integrated into the vehicle braking system and monitors specific braking parameters such as vehicle acceleration, vehicle speed, the coefficient of friction of the road, and the amount of brake pedal pressure input from a driver. Once minimum threshold values for the ABS characteristics are exceeded, a controller activates the ABS system and the ABS pump provides pressurized brake fluid as needed, instead of pressurization from the brake pedal and master cylinder.

Conventional ABS pumps have complex piston structures including through bores drilled for providing passageways for brake fluid to pass through the piston. To control direction of flow, one-way inlet check valves are provided in the piston fluid passageway between the inlet and the outlet passageways of the pump. The one-way check valves allow fluid from the inlet to pass through the piston to the outlet but prevent flow in the opposite direction. Thus, the piston is able to build up pressure for delivery of pressurized fluid to the output. Conventional pistons have O-rings or D-rings for sealing engagement between the exterior of the piston and the associated housing bore. One-way check valves usually have a ball biased by a spring and require a machined seating surface for the ball to properly seal a desired passage. In addition, sleeves and connectors are utilized for retaining the spring and ball within the piston. The check valve increases the overall length of the piston and thereby requires the pump to be proportionally larger as well. Therefore, the overall weight of the pump is undesirably heavier.

SUMMARY OF THE INVENTION

The present invention is directed to a pump for an antilock brake system having a housing including an inlet and an outlet. A bore located in the housing is in fluid communication with the inlet and the outlet. At least one piston is located in the bore and an eccentric shaft drives the piston in a reciprocating motion to pump brake fluid. A motor is provided for driving the eccentric shaft and a directional seal is connected to the at least one piston and is configured to pressurize fluid on a forward stroke and permit fluid to flow past the seal on a return stroke.

The present invention further provides a pump for a vehicle antilock brake system including a housing having an inlet and an outlet. A bore is located in the housing and is in fluid communication with the inlet and outlet. First and second substantially solid pistons are located in the bore and an eccentric shaft drives the pistons in a reciprocating motion to pump brake fluid. In addition, a motor is provided for driving the eccentric shaft and a directional seal is provided on each piston and is configured to pressurize fluid on a forward stroke and permit fluid to flow past the seal on a return stroke.

Further, the present invention provides a pump for a vehicle antilock brake system having a housing with an inlet and an outlet and a bore located in the housing that is in fluid communication with the inlet and outlet. First and second pistons are located in the bore and are substantially solid and a have circumferential groove. An eccentric shaft is provided for driving the first and second pistons in a reciprocating motion. A motor is utilized for driving the eccentric shaft. In addition, an elastomeric directional seal is located in each of the circumferential grooves of the first and second pistons and includes a main body and an angled lip, wherein the angled lip extends outwardly from the main body to selectively contact the bore of the housing and pressurize fluid on a forward stroke and permit fluid to flow past the seal on a return stroke.

Optionally, a plurality of through bores can be provided in a flange of the piston to increase fluid flow past the seal. Another option for the present invention includes locating a backing ring in the circumferential groove adjacent the seal to increase seal stiffness.

The present invention eliminates the need for a one-way check valve located in the piston. Instead, the present invention provides a directional seal located on the exterior of the piston for selectively sealing a gap between the piston and its associated bore. The directional seal is preferably cup-shaped in cross-section such that the seal lip expands outwardly for engagement with the bore when the piston is driven toward the outlet passageway. However, upon a return stroke toward the inlet passageway, the directional seal lips tend to collapse toward the piston and permit fluid to flow from the inlet toward the outlet and thereby replenish the working fluid in a pumping chamber for the next piston pressure stroke.

Accordingly, the present invention simplifies the overall design and eliminates the need for extra machining steps required for a one-way inlet check valve to be located within a piston. At least approximately six component parts are eliminated by the present invention versus conventional pumps for brake systems. The present pump design further simplifies assembly and thereby reduces manufacturing costs. Further, elimination of a one-way check valve in the piston permits a shorter piston to be used, which translates into a smaller, more compact pump design. In addition, such a compact pump has reduced weight to provide for a lighter, more fuel efficient, vehicle.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
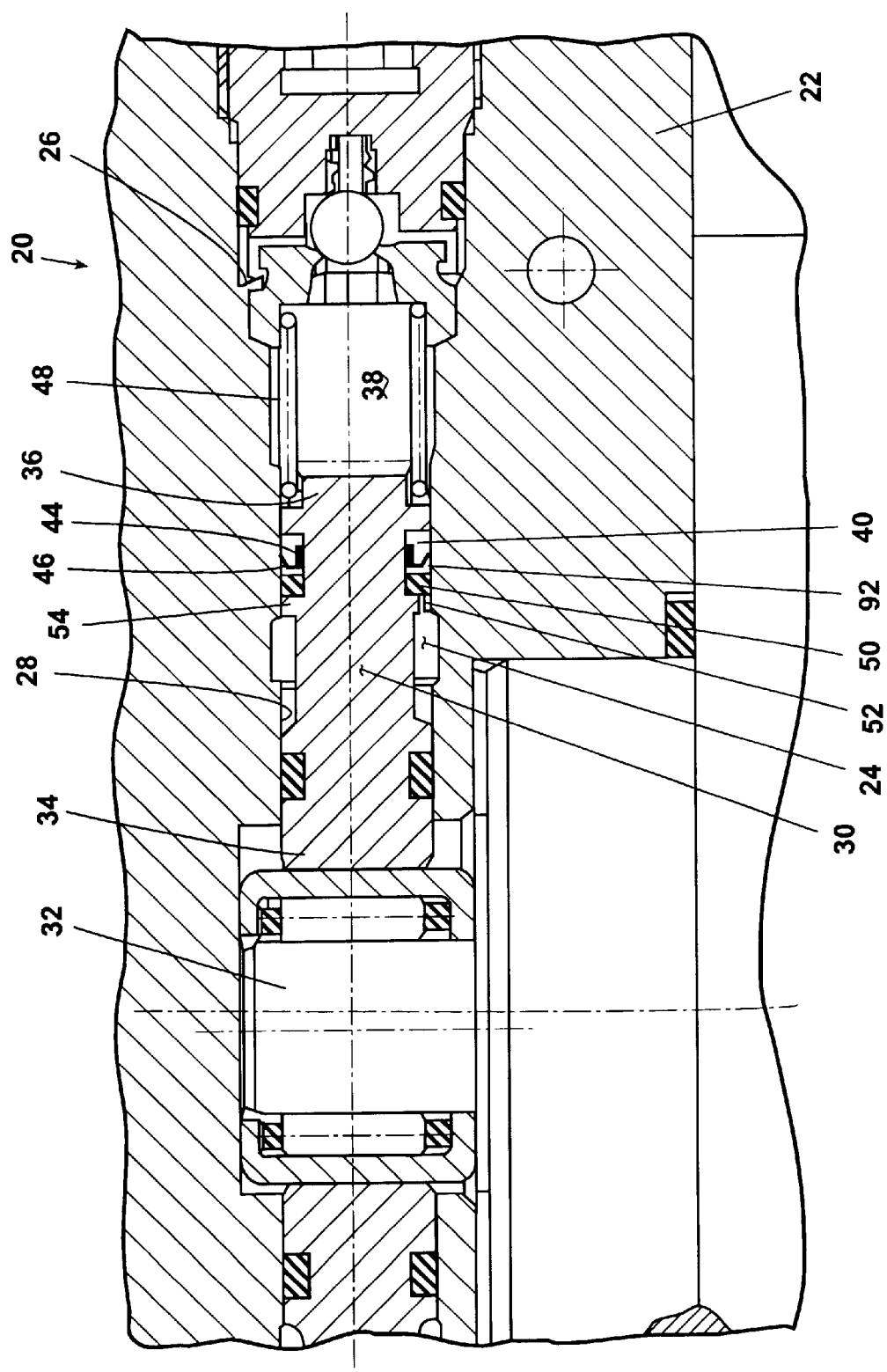
FIG. 1 shows a partial cross-sectional view of a pump according to the present invention.

FIG. 1 shows a reciprocating piston-type pump 20 for use with vehicle brake control systems such as antilock brake systems and traction control systems. Pump 20 includes a housing 22 having a fluid inlet 24 and a fluid outlet 26 for connection with a brake control circuit (not shown). A bore 28 extends within pump housing 22 and is in fluid communication with both the inlet 24 and outlet 26. First and second pistons 30 are positioned within bore 28 for sliding reciprocating motion via a motor driven eccentric shaft 32.

Each piston 30 has substantially the same configuration including a first end 34 located adjacent eccentric shaft 32 and a second end 36 located adjacent a pumping chamber 38 in bore 28. Piston 30 further includes a groove 40 formed near second end 36 for receiving a directional seal 42 mounted therein for selectively engaging bore 28. Directional seal 42 is made from elastomeric material, however, any suitable material can be utilized. In addition, seal 42 includes a main body portion 44 and a generally angled lip portion 46 that projects away from eccentric shaft 32 forming a general cup shape with main body portion 44, as viewed in cross-section. First and second pistons 30 are alternately driven outwardly in a direction away from eccentric shaft 32. During outward piston travel toward pumping chamber 38, directional seal 42 tends to expand outwardly to sealingly engage bore 28 and pressurize fluid for delivery through outlet 26. As the piston 30 returns toward eccentric shaft 32 via force of return spring 48, lip 46 of directional seal 42 tends to collapse or deflect inwardly toward piston 30 and away from bore 28 allowing fluid from inlet 24 to travel past seal 42. Thus, new replenishing fluid from inlet 24 is introduced into pumping chamber 38, which was previously evacuated of fluid via outlet 26. Thus, upon the next forward stroke of piston 30, seal 42 will once again pressurize fluid in pumping chamber 38 for evacuation through outlet 26. And upon the piston return stroke, fluid from inlet 24 can bypass seal 42 for replenishing pumping chamber 38. Accordingly, directional seal 42 eliminates the need for an inlet check valve that is typically required for pumps in antilock braking systems. Instead, directional seal 42 controls passage of fluid from inlet 24 to pumping chamber 38 and ultimately to outlet 26.

Optionally, but preferably, a backing ring 50 is provided in groove 40 adjacent to seal 42 for increased stiffness and reduce any tendency for seal lip 46 to become inverted with respect to main body 44. Also, it is to be understood that backing ring 50 is designed such that it does not significantly impede the flow of fluid as the fluid travels from inlet 24 to outlet 26. There are a number of ways to accomplish this objective all of which are readily known by one skilled in the art. Such ways include providing sufficient clearance between ring 50 and bore 28 or creating passageways through ring 50. In addition, ring 50 is made from plastic or any other suitable material to reduce wear caused by gouging and increase control of dimensional tolerances between piston 30 and bore 28. Ring 50 is illustrated as being spaced away from seal 42 for sake of clarity. It should be understood that ring 50 and seal 42 should be relatively close together for optimum performance. However, backing ring 50 is not required for pump 20 of the present invention to operate.

Optionally, a series of through bores 52 can be spaced circumferentially around flange 54 adjacent groove 40 to permit increased fluid flow past seal 42. In addition, dimensional relationships between the diameter and thickness of flange 54 as compared to the diameter of bore 28 can be selected to increase or decrease desired fluid flow characteristics. Therefore, piston 30 of the present is substantially solid. In contrast, conventional pump pistons have complex drilled passageways extending crosswise and lengthwise to achieve fluid flow.

By eliminating an inlet check valve, the invention reduces the total number of parts by at least six thereby simplifying assembly and lowering the overall pump cost. The present invention also allows for relatively shorter pistons, which provides a smaller, more compact pump design and affords a lighter weight pump.

Although directional seal 42 is illustrated as generally cup shaped, seal 42 can have any suitable configuration that achieves the purpose of replacing a one-way inlet check valve.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A pump for a vehicle antilock brake system comprising:
    a housing having an inlet and an outlet;
    a bore located in the housing and being in fluid communication with the inlet and the outlet;
    first and second pistons located in the bore, each piston being substantially solid and having a circumferential groove;
    an eccentric shaft for driving the first and second pistons in a reciprocating motion; and
    an elastomeric directional seal located in the circumferential grooves of the first and second pistons and including a main body and an angled lip, wherein the angled lip extends outwardly from the main body to selectively contact the bore of the housing and pressurize fluid on a forward stroke and permit fluid to flow past the seal on a return stroke.

2. The pump of claim 1, further including a backing ring located in the groove on each of the pistons, adjacent to the seal for increasing seal stiffness and reducing wear.

3. The pump of claim 1, further including a plurality of through bores provided in a flange on each of the pistons for increased fluid flow past the seal.

4. The pump of claim 1, wherein the directional seal has a generally cup shape.

* * * * *